Oct. 27, 1942.  J. E. BUXTON  2,300,337

ENGINE STARTER GEARING

Filed Aug. 22, 1940

Witness:
Burr W. Jones

INVENTOR.
James E. Buxton
BY Clinton S. Janes
ATTORNEY.

Patented Oct. 27, 1942

2,300,337

UNITED STATES PATENT OFFICE 2,300,337

ENGINE STARTER GEARING

James E. Buxton, Elmira Heights, N. Y., assignor to Bendix Aviation Corporation, South Bend, Ind., a corporation of Delaware Application August 22, 1940, Serial No. 353,660

8 Claims. (Cl. 74—7)

The present invention relates to engine starter gearing and more particularly to a drive which is actuated by a starting motor to automatically connect the motor to a member of an engine to be started, and to disconnect the starting motor when the engine becomes self-operative.

It is an object of the present invention to provide a novel starter drive which is efficient and reliable in operation, simple and economical in construction, small in size and especially short in length as compared to commercial units of comparable capacity.

Further objects and advantages will be apparent from the following description taken in connection with the accompanying drawing in which.

Figure 1:
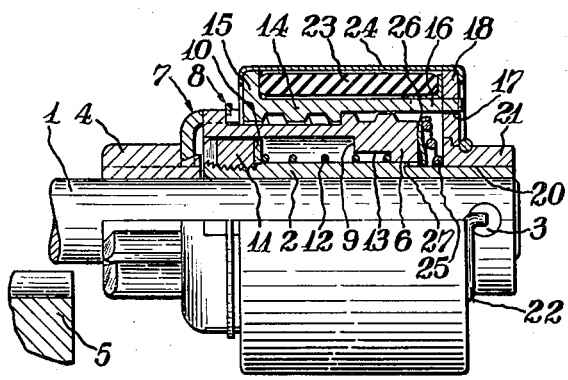
Fig. 1 is a side elevation partly in section of a preferred embodiment of the invention.
Figure 2:
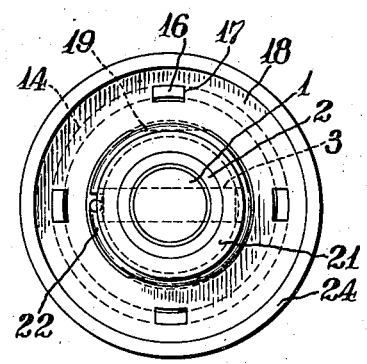
Fig. 2 is an end view thereof from the right in Fig. 1.

In the drawing there is illustrated a power shaft 1 which may be the extended armature shaft of a starting motor, not illustrated. A hollow sleeve 2 is fixedly mounted on the end of the power shaft 1 by any suitable means such as a cross pin 3. A pinion 4 is slidably journalled on the power shaft 1 for longitudinal movement into and out of engagement with a member such as a flywheel gear 5 of an engine to be started.

Figure 3:
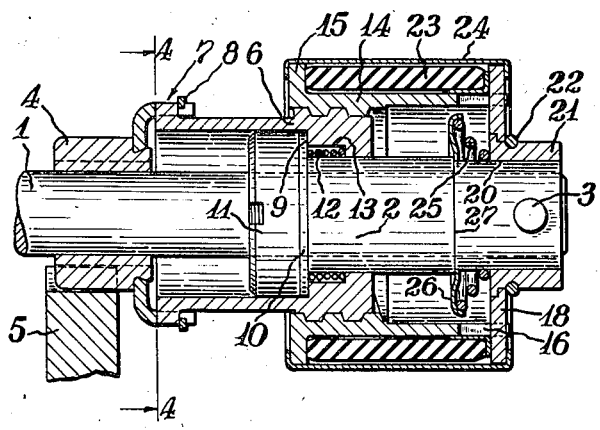
Fig. 3 is a view partly in section and partly in side elevation showing the parts in driving position.
Figure 4:
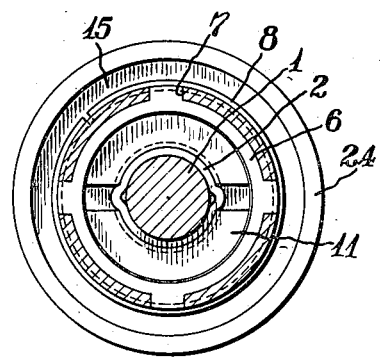
Fig. 4 is a section taken substantially on the line 4—4 of Fig. 3.

A hollow screw shaft 6 is slidably journalled on the sleeve 2 and is rigidly connected with the pinion 4 by any suitable means such as the interlocking connection indicated at 7 in conjunction with a split retaining ring 8. Screw shaft 6 is provided with an internal shoulder 9 adapted to abut against a stop nut 11 fixed on the end of sleeve 2 adjacent the pinion 4 whereby the stop nut defines the engaging position of the pinion as illustrated in Fig. 3. A washer 10 may be interposed between the shoulder 9 and stop nut 11 to prevent sticking. Means for normally maintaining the pinion in idle position against the end of sleeve 2 is provided in the form of a light compression spring 12 mounted on the sleeve, one end being seated in a recess 13 in the screw shaft and the other end bearing against the stop nut 11.

A nut 14 having a radial flange 15 is threaded on the screw shaft 6 and is provided with lugs or tangs 16 arranged to extend through openings 17 in a flange 18 non-rotatably fixed as by means of a "double-D" connection 19 on a driving member 21. The driving member is mounted on a reduced portion 20 at the end of sleeve 2 and is rigidly connected to the sleeve and the power shaft 1 by means of the cross pin 3 which is retained by suitable means such as a spring ring 22. The ring 22 also serves to retain the flange 18 on the driving member 21.

A yielding transmission member 23 in the form of a sleeve of elastically deformable material, is mounted on the nut 14 between flange 15 and flange 18 and serves to yieldingly hold the flanges in extended relation. Means for limiting such extension is provided in the form of an enclosing sleeve 24 which is spun over at its ends so as to enclose said flanges.

The threads of the screw shaft 6 and nut 14 extend over only a part of the length of said members whereby when the screw shaft is in its idle position as illustrated in Fig. 1, the threads are disconnected so as to permit the pinion and screw shaft assembly to overrun freely. Means for insuring initial re-engagement of the threads upon actuation of the drive, are provided in the form of a compression spring 25 mounted on the reduced portion 20 of sleeve 2, bearing at one end against the adjacent end of the driving member 21 and at its other end in a thimble 26 slidably mounted on the reduced portion 20 of sleeve 2. The expansion of spring 25 is limited by a shoulder 27 on sleeve 2 formed at the end of the reduced portion 20 thereof.

In operation, starting with the parts in the positions illustrated in Fig. 1, rotation of the power shaft 1 by the starting motor is transmitted through sleeve 2, driving member 21 and flange 18 to the nut 14. The pinion and screw shaft asesmbly is thereby threaded to the left until the pinion engages the engine gear 5 as illustrated in Fig. 3, and further longitudinal movement thereof is prevented by the abutment of shoulder 9 in the screw shaft aaginst the stop nut 11. Thereafter, the nut 14 is moved to the right, compressing the transmission member 23 until sufficient torque has been built up to cause rotation to be imparted to the engine gear, such relative motion being permitted by the sliding movement of tangs 16 in the openings 17 of flange 18.

When the engine starts, overrunning of the pinion and screw shaft assembly causes the nut to return to its normal position, after which the screw shaft is threaded to the right until it disengages from the nut and overruns until the momentum of the pinion and screw shaft assembly is dissipated. The reentry spring 25 then holds the screw shaft in position for re-engagement of its threads in the nut 14 upon re-operation of the drive, the anti-drift spring 12 serving to yieldingly maintain the screw shaft in that position.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In an engine starter drive, a power shaft, a pinion slidably journalled thereon, a sleeve fixed to the shaft, a hollow screw shaft slidably journalled on the sleeve and rigidly connected to the pinion, stop means on the sleeve defining the operative position of the pinion and screw shaft, a flanged nut on the screw shaft, a flange member rigidly mounted on the sleeve, and elastically compressible transmission means interposed between said flanges.

2. In an engine starter drive, a power shaft, a pinion slidably journalled thereon, a sleeve fixed to the shaft a hollow screw shaft slidably journalled on the sleeve and rigidly connected to the pinion, stop means on the sleeve defining the operative position of the pinion and screw shaft, a flanged nut on the screw shaft, a flange member rigidly mounted on the sleeve and slidably but non-rotatably connected to the nut, and an annular body of elastically deformable material between said flanges.

3. In an engine starter drive, a power shaft, a pinion slidably journalled thereon, a sleeve fixed to the shaft, a hollow screw shaft slidably journalled on the sleeve having an internal shoulder and an extension fixed to the pinion, a stop nut on the sleeve adapted to engage said shoulder and thereby limit longitudinal movement of the screw shaft and pinion, a nut on the screw shaft, a flange member fixed on the sleeve, and an elastic transmission means between the nut and flange member normally holding them in extended relation.

4. In an engine starter drive, a power shaft, a pinion slidably journalled thereon, a sleeve fixed to the shaft, a hollow screw shaft slidably journalled on the sleeve having an internal shoulder and an extension fixed to the pinion, a stop nut on the sleeve adapted to engage said shoulder and thereby limit longitudinal movement of the screw shaft and pinion, a nut on the screw shaft having a radial flange, a flange member fixed to the power shaft, a ring of elastically deformable material surrounding the nut between said flanges, and means limiting the separation of the flanges and maintaining the elastic ring under initial compression.

5. In an engine starter drive, a power shaft, a pinion and hollow screw shaft assembly slidably journalled thereon for movement into and out of engagement with a member of an engine to be started, an internal abutment for the screw shaft limiting the engaging movement thereof, a nut on the screw shaft, means slidably but non-rotatably connecting the nut to the power shaft, yielding means opposing longitudinal movement of the nut, said screw shaft being adapted to run out of the threads of the nut when the pinion is in idle position, and yielding means urging the screw shaft into threaded engagement with the nut.

6. In an engine starter drive, a power shaft, a pinion and hollow screw shaft assembly slidably journalled thereon for movement into and out of engagement with a member of an engine to be started, an internal abutment for the screw shaft limiting the engaging movement thereof, a nut on the screw shaft, means slidably but non-rotatably connecting the nut to the power shaft, yielding means opposing longitudinal movement of the nut, said screw shaft being adapted to run out of the threads of the nut when the pinion is in idle position, a compression spring within the nut urging the screw shaft into threaded engagement with the nut, and means for limiting the expanion of the compression spring.

7. In an engine starter drive, a power shaft, a sleeve fixed thereon having a reduced external diameter at one end forming a shoulder, a stop nut fixed on the other end of the sleeve, a screw shaft slidably journalled on the sleeve and stop nut having an internal shoulder adapted to abut against the stop nut, a pinion slidably journalled on the power shaft rigidly connected to the screw shaft, a nut on the screw shaft, means slidably but non-rotatably connecting the nut to the power shaft, yielding means opposing longitudinal movement of the nut, a spring on the sleeve adapted to engage the screw shaft, and means cooperating with said shoulder for limiting expansion of the spring.

8. A unitary engine starter drive comprising a sleeve, a screw shaft slidably journalled thereon, a nut on the screw shaft, and an elastic cushion ring surrounding the nut, means fixed to the sleeve for rotating the nut and cooperating with the cushion ring to resist longitudinal movement of the nut, a pinion fixed to the screw shaft, and stop means on the sleeve and within the screw shaft limiting longitudinal movement of the pinion.

JAMES E. BUXTON.